H. GEILSDORFER & A. PITZER.
BUTTER DISPENSER.
APPLICATION FILED SEPT. 20, 1918.

1,288,558.

Patented Dec. 24, 1918.
2 SHEETS—SHEET 1.

Inventors
Herman Geilsdorfer &
Alfred Pitzer
By their Attorney
Hauk v Briesen

H. GEILSDORFER & A. PITZER.
BUTTER DISPENSER.
APPLICATION FILED SEPT. 20, 1918.
1,288,558.
Patented Dec. 24, 1918.
2 SHEETS—SHEET 2.
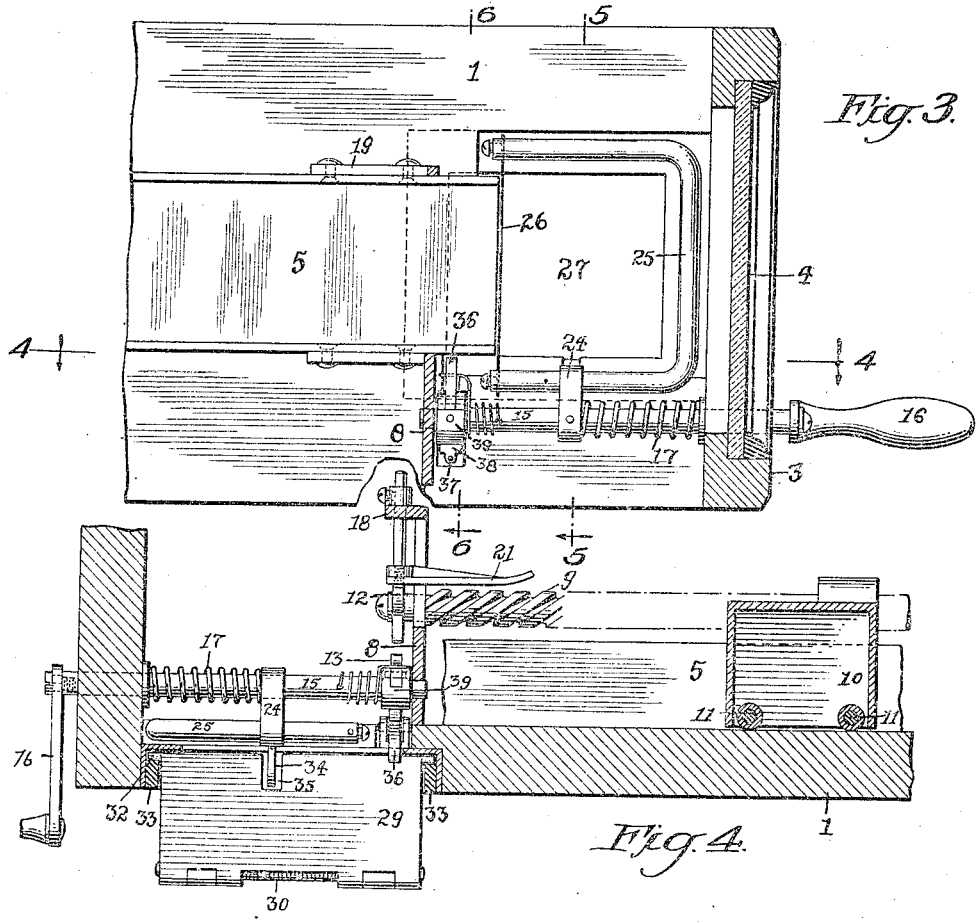
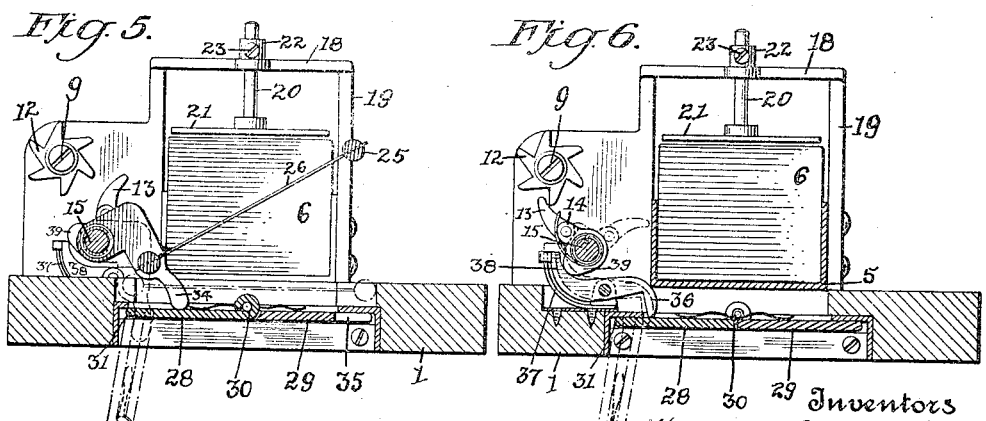
Inventors
Herman Geilsdorfer &
Alfred Pitzer
By their Attorney

UNITED STATES PATENT OFFICE.

HERMAN GEILSDORFER, OF BROOKLYN, AND ALFRED PITZER, OF NEW YORK, N. Y.

BUTTER-DISPENSER.

1,288,558.

Specification of Letters Patent. Patented Dec. 24, 1918.

Application filed September 20, 1918. Serial No. 254,920.

*To all whom it may concern:*

Be it known that we, HERMAN GEILSDORFER and ALFRED PITZER, citizens, respectively, of the United States and of Germany, and residents, respectively, of Brooklyn, in the county of Kings and State of New York, and of New York city, in the county and State of New York, have invented certain new and useful Improvements in Butter-Dispensers, of which the following is a specification.

This invention relates to a butter dispenser of novel construction, by means of which pieces or pats of butter may be readily cut from a bar, and delivered to a suitable receiving vessel, in a sanitary, economic and cleanly manner, and without subjecting the butter to pressure while being cut.

The invention consists in the various features of novelty, more fully pointed out in the specification and appended claims.

In the accompanying drawing:—

Figure 1:
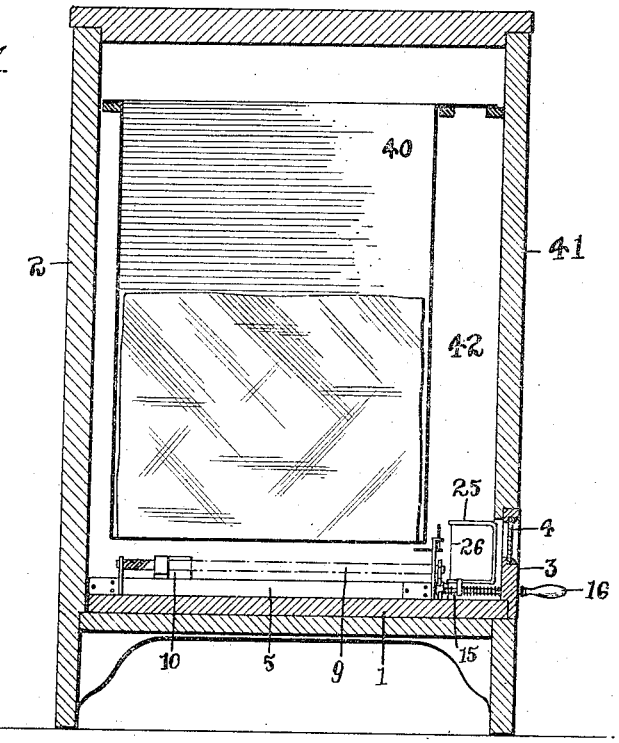
Figure 2:
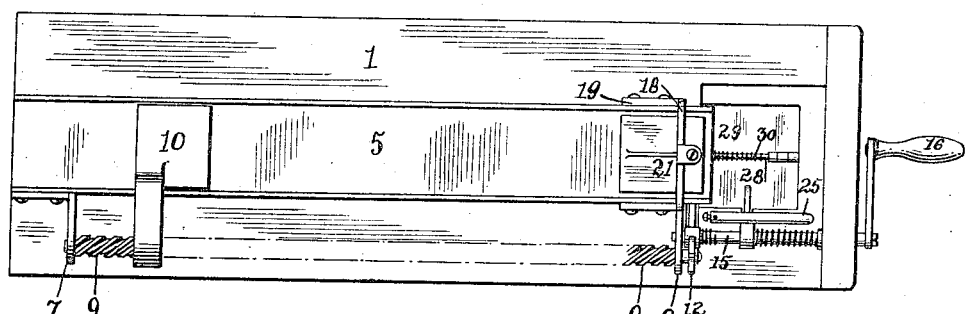

Figure 1 is a vertical section of an ice box provided with a butter dispenser embodying our invention;

Fig. 2, a plan of the dispenser;

Fig. 3, an enlarged plan of the forward part of the dispenser;

Fig. 4, a section on line 4—4 of Fig. 3;

Fig. 5, a section on line 5—5 of Fig. 3, and

Fig. 6, a section on line 6—6 of Fig. 3.

The dispenser is composed of a base plate 1, which forms preferably, the bottom of a drawer and is adapted to be inserted into an ice box 2. The front 3 of the drawer is provided with a window 4, and is, in the closed position, of the drawer, countersunk within the front of the ice box.

Upon plate 1 is mounted a trough-shaped container 5 adapted to receive a bar 6 of print or tub butter to be subdivided. Sidewise of container 5 are provided a rear bracket 7 and a front bracket 8 in which is free to turn a worm or spiral 9, which parallels the container, and operatively engages an eyed arm extending laterally from a pusher 10 which is located within the container. This pusher is preferably made hollow for the accommodation of a pair of traction rolls, 11, with which it is provided, and which permit the pusher to travel freely along the bottom of the container.

Upon the forward end of worm 9 is mounted a ratchet wheel 12 adapted to be engaged by a spring pawl 13, turning in a bearing 14 of a rock shaft 15, which passes through front 3 and is here provided with a handle 16. By giving a short forward or right hand turn to this handle, worm 9 will be so turned by pawl 13 and ratchet wheel 12, as to advance pusher 10 for a short distance, and to correspondingly advance the butter bar 6, thus causing its end to project over the front edge of container 5. Upon giving a back turn to the handle, the spring pawl 13 will pass inoperatively over the teeth of wheel 12, so that no motion is imparted to the pusher. Shaft 15 turns with its rear end in bracket 8, against which it is pressed by a coiled spring 17. By pulling the shaft forward, it will become unseated from bracket 8, to uncouple the container, and permit the latter, together with its adjuncts, to be removed, and cleaned from time to time.

In order to hold down the butter bar at the front of the container, and prevent it from tilting while being cut, there extends from bracket 8, across the container, an arm or member 18, supported by a foot 19. The arm is apertured for the reception of a vertically adjustable rod 20 carrying a platen 21 which is adapted to be set to the height of the butter bar by means of a collar 22 that rests upon arm 18 and is furnished with a set screw 23. Upon rock shaft 15 is mounted by eyed bracket 24, a U-shaped cutter head 25, across the two shanks of which is spanned, a cutting member or wire 26, which is adapted to sweep through a vertical plane directly opposite the end of container 5.

Forward of container 5 and extending a distance underneath the same, base 1 is provided with a discharge opening 27 controlled by a trap door shown to be formed of two foldable leaves 28 and 29, connected by a spring hinge 30 that is centered along the longitudinal axis of the container. Leaf 28 turns on gudgeons 31, while leaf 29 is provided with laterally extending projections 32 that ride along rails 33 arranged at right angles to the container.

From cutter head 25 depends a tappet 34 which while the cutter head is swung down, will bear against the upper face of leaf 28, and force the same into a vertical position. Leaf 28 on being thus swung down, will cause leaf 29 to be likewise swung down (the projections 32 traveling during this operation along rails 33) so that in this way, the door is opened as shown by dotted lines in Fig. 5. In order to permit leaf 29 to fold closely or into facewise contact with leaf 28, the former is provided with a notch 35 for the clearance of tappet 34.

To hold the gate in its open position, there is pivoted to a suitable support, a dog or catch 36, influenced by a spring 37, and adapted to be sprung over the free edge of leaf 29, by the inward movement of the latter (dotted lines Fig. 6). Dog 36 is provided with a curved tail piece 38 that operatively engages a cam or eccentric 39 mounted on shaft 15, and by means of which the dog will be raised out of engagement with the leaf, on the reverse movement of the shaft.

The operation of the device will be apparent from the foregoing description:

By turning handle 16 forward, pusher 10 will first be advanced to feed the butter bar forward until a certain predetermined portion protrudes from container 5. The further forward movement of the handle will cause the cutter 26 to sweep across the front of the container and thus cut off a pat of butter from the bar. As the cutter descends, the door will be simultaneously opened by the tappet 34, in manner previously described, and held in its open position by the dog 36, so that the butter pat may fall freely down through base plate 1, and upon a suitable receiving dish (not shown). When the cutting operation has been finished, handle 16 is turned back so as to first raise the cutter, and then release the hold of dog 36 on leaf 29, thereby permitting spring hinge 30 to return the leaves to their normal horizontal or closed position.

If desired, a number of dispensers may be mounted side by side on the same base plate, so that a plurality of butter pats may be simultaneously obtained by different waiters.

As more fully shown in Fig. 1, the installation of the device into the ice box should be such that the ice compartment 40 is set back a distance from the ice box front 41, so as to leave an intervening cold air chamber 42. While the body of the container 5 projects below the ice compartment 40, the cutter mechanism and the gates are accommodated by compartment 42, so that while the butter is always thoroughly cooled, its cutting and delivery is unimpeded, while furthermore, the gates will prevent the escape of cold air, except during the comparatively short time required for the dispensing of the butter.

We claim:

1. In a butter dispenser, a container, a pusher movable therein, a worm operatively engaging the pusher, a rock-shaft, a cutter head mounted on the rock-shaft, a foldable bipartite door located in front of the container, and means on the rock-shaft for operating said door.

2. In a butter dispenser, a container, a pusher movable therein, a worm operatively engaging the pusher, a ratchet wheel mounted on the worm, a rock-shaft, a pawl carried by the rock-shaft and engaging said ratchet wheel, a cutter head mounted on the rock-shaft, a door located in front of the container, and means on the rock-shaft for operating said door.

3. A butter dispenser comprising a base plate, a container mounted thereon, a pusher, a pair of brackets, a worm journaled in the brackets and operatively engaging the pusher, a ratchet wheel carried by the worm, an axially slidable rock shaft, a pawl on said shaft that is adapted to engage said ratchet wheel, said shaft being carried by the base plate and being removably journaled in one of said brackets.

4. In a butter dispenser, a rock shaft, a cutter head secured thereto, a cutter carried by said head, a tappet operable by the rock shaft, a foldable bipartite door, said door having a pair of leaves and a connecting spring hinge, one of said leaves being adapted to be engaged by said tappet, a pair of rails, and projections on the other door-leaf that engage said rails.

5. In a butter dispenser, a rock shaft, a cutter head secured thereto, a cutter carried by said head, a bipartite trap door, means on said shaft for opening said door, a dog adapted to lock the door in its open position, and means operated by said shaft for withdrawing said dog.

6. In a butter dispenser, a rock shaft, a cutter head secured thereto, a cutter carried by said head, a cam likewise mounted on the shaft, a bipartite foldable door having a pair of spring-controlled leaves, a tappet operable by the rock shaft and adapted to open the door, and a dog adapted to be projected over the open door, said dog being in engagement with said cam.

7. In a butter dispenser, a container, a pusher movable therein, a worm operatively engaging the pusher, a rock shaft, a cutter carried by said shaft and adapted to be projected across the container, a door arranged in front of the container, means operable by the rock shaft for opening the door, and additional means operable by the rock shaft for closing said door.

HERMAN GEILSDORFER.
ALFRED PITZER.

Copies of this patent may be obtained for five cents each, by addressing the "Commissioner of Patents, Washington, D. C."